United States Patent
Goto et al.

(10) Patent No.: US 9,690,011 B2
(45) Date of Patent: Jun. 27, 2017

(54) POLARIZING FILM, METHOD OF MANUFACTURING POLARIZING FILM, AND IMAGE DISPLAY APPARATUS USING THE POLARIZING FILM

(71) Applicant: NITTO DENKO CORPORATION, Ibaraki-shi, Osaka (JP)

(72) Inventors: Shusaku Goto, Ibaraki (JP); Takashi Kamijo, Ibaraki (JP); Minoru Miyatake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 143 days.

(21) Appl. No.: 14/464,199

(22) Filed: Aug. 20, 2014

(65) Prior Publication Data
US 2015/0070763 A1    Mar. 12, 2015

(30) Foreign Application Priority Data
Sep. 6, 2013   (JP) ................................. 2013-184792

(51) Int. Cl.
*G02B 5/30* (2006.01)
*G02B 1/08* (2006.01)
(Continued)

(52) U.S. Cl.
CPC .............. *G02B 1/08* (2013.01); *B29C 47/025* (2013.01); *B29D 11/00644* (2013.01); *B29D 11/00894* (2013.01); *G02B 5/3033* (2013.01); *B29C 47/0057* (2013.01); *B29K 2029/04* (2013.01); *B29K 2031/04* (2013.01); *B29K 2105/256* (2013.01); *B29K 2995/0034* (2013.01)

(58) Field of Classification Search
CPC .. G02B 5/3016; G02B 5/3025; G02B 5/3033; B29D 11/00644
USPC .................................... 359/487.02; 427/163.1
See application file for complete search history.

(56) References Cited

U.S. PATENT DOCUMENTS 2,445,579 A * 7/1948 Hyman, Jr. .......... G02B 5/3033
                                                        264/1.34
8,314,987 B2   11/2012 Goto et al.
(Continued)

FOREIGN PATENT DOCUMENTS

JP         55-7783    *  1/1980
JP        57-124701   *  8/1982
(Continued)

OTHER PUBLICATIONS

Office Action dated Jul. 1, 2015, issued in counterpart Japanese Application No. 2013-184792, with English Translation (13 pages).

*Primary Examiner* — Ricky D Shafer
(74) *Attorney, Agent, or Firm* — Westerman, Hattori, Daniels & Adrian, LLP (57) ABSTRACT

There is provided a polarizing film that is excellent in external appearance and can contribute to the improvement of the display characteristics of an image display apparatus. A polarizing film according to an embodiment of the present invention includes a polyvinyl alcohol-based resin film containing iodine. The polarizing film has a ratio $I_2/I_1$ between an iodine concentration $I_1$ on one surface and an iodine concentration $I_2$ on another surface of 3.0 or more.

14 Claims, 6 Drawing Sheets

(51) Int. Cl.
  *B29D 11/00* (2006.01)
  *B29C 47/02* (2006.01)
  *B29K 29/00* (2006.01)
  *B29K 105/00* (2006.01)
  *B29C 47/00* (2006.01)
  *B29K 31/00* (2006.01)

(56) References Cited

U.S. PATENT DOCUMENTS

| | | |
|---|---|---|
| 8,320,042 B2 | 11/2012 | Goto et al. |
| 8,379,169 B2 | 2/2013 | Kitagawa et al. |
| 8,411,360 B2 | 4/2013 | Kitagawa et al. |
| 8,520,169 B2 | 8/2013 | Kitagawa et al. |
| 8,520,171 B2 | 8/2013 | Kitagawa et al. |
| 8,559,105 B2 | 10/2013 | Yoshimi et al. |
| 8,699,135 B2 | 4/2014 | Goto et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 9,354,372 B2* | 5/2016 | Kamijo ............... G02B 5/3033 |
| 2010/0202051 A1 | 8/2010 | Yoshimi et al. |
| 2011/0205628 A1* | 8/2011 | Yasen ............. B29D 11/00644 359/488.01 |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0281279 A1 | 11/2012 | Goto et al. |
| 2013/0100529 A1 | 4/2013 | Kitagawa et al. |
| 2013/0114139 A1 | 5/2013 | Kitagawa et al. |
| 2013/0128357 A1 | 5/2013 | Izaki et al. |
| 2014/0186568 A1 | 7/2014 | Kitagawa et al. |
| 2015/0219797 A1* | 8/2015 | Goto ....................... G02B 1/111 359/487.02 |

FOREIGN PATENT DOCUMENTS

| | | |
|---|---|---|
| JP | 2000-338329 A | 12/2000 |
| JP | 2001-350021 A | 12/2001 |
| JP | 2004-20633 A | 1/2004 |
| JP | 2009-98653 A | 5/2009 |
| JP | 2010-26498 A | 2/2010 |
| JP | 2010-44211 A | 2/2010 |
| JP | 4751481 B1 | 8/2011 |
| JP | 2012-159778 A | 8/2012 |
| JP | 2012-256018 A | 12/2012 |

* cited by examiner

POLARIZING FILM, METHOD OF MANUFACTURING POLARIZING FILM, AND IMAGE DISPLAY APPARATUS USING THE POLARIZING FILM

This application claims priority under 35 U.S.C. Section 119 to Japanese Patent Application No. 2013-184792 filed on Sep. 6, 2013, which is herein incorporated by reference.

BACKGROUND OF THE INVENTION

1. Field of the Invention

The present invention relates to a polarizing film, a method of manufacturing the polarizing film, and an image display apparatus using the polarizing film.

2. Description of the Related Art

Polarizing films are placed on both sides of a liquid crystal cell of a liquid crystal display apparatus as a typical image display apparatus, the placement being attributable to an image-forming mode of the apparatus. For example, the below-indicated method has been proposed as a method of manufacturing the polarizing film (for example, Japanese Patent Application Laid-open No. 2000-338329). A laminate having a resin substrate and a polyvinyl alcohol (PVA)-based resin layer is stretched, and is then subjected to a dyeing treatment so that the polarizing film may be formed on the resin substrate. According to such method, a polarizing film having a small thickness is obtained. Accordingly, the method has been attracting attention because of its potential to contribute to thinning of an image display apparatus in recent years. However, the polarizing film obtained by such method is poor in external appearance, and sufficient display characteristics may not be obtained in the case of using the polarizing film in an image display apparatus.

SUMMARY OF THE INVENTION

According to an embodiment of the present invention, there is provided a polarizing film that is excellent in external appearance and can contribute to the improvement of the display characteristics of an image display apparatus.

A polarizing film according to an embodiment of the present invention includes a polyvinyl alcohol-based resin film containing iodine. The polarizing film has a ratio $I_2/I_1$ between an iodine concentration $I_1$ on one surface and an iodine concentration $I_2$ on another surface of 3.0 or more.

In one embodiment of the present invention, the surface having the iodine concentration $I_1$ has an anisotropic reflection (Rc/Rp) at a wavelength of 680 nm of 1.50 or less.

In one embodiment of the present invention, the polarizing film is used so that the surface having the iodine concentration $I_1$ is on a viewer side.

According to another aspect of the present invention, there is provided a manufacturing method for the polarizing film as described above. The manufacturing method includes: forming a polyvinyl alcohol-based resin layer on one side of a resin substrate; and stretching and dyeing a laminate of the resin substrate and the polyvinyl alcohol-based resin layer to turn the polyvinyl alcohol-based resin layer into a polarizing film. The polarizing film has a ratio $I_2/I_1$ between an iodine concentration on a surface on a resin substrate side and an iodine concentration $I_2$ on a surface on an opposite side to the resin substrate of 3.0 or more.

In one embodiment of the present invention, the stretching is performed using in-air stretching alone.

In one embodiment of the present invention, a stretching temperature in the in-air stretching is 120° C. or more.

According to another aspect of the present invention, there is provided an image display apparatus. The image display apparatus includes the polarizing film as described above. The polarizing film is arranged so that the surface having the iodine concentration $I_1$ is on a viewer side.

DETAILED DESCRIPTION OF THE PREFERRED EMBODIMENTS

Hereinafter, embodiments of the present invention are described. However, the present invention is not limited to these embodiments.

A. Polarizing Film

A polarizing film of the present invention includes a polyvinyl alcohol-based resin (hereinafter referred to as "PVA-based resin") film containing iodine.

Any appropriate resin can be adopted as the PVA-based resin for forming the PVA-based resin film. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The polarizing film is substantially a PVA-based resin film onto which iodine is adsorbed in an aligned state. Further, the PVA-based resin film has a ratio $I_2/I_1$ between an iodine concentration $I_1$ on one surface and an iodine concentration $I_2$ on the other surface of 3.0 or more, preferably 3.5 or more, more preferably 4.0 or more. When the ratio between the iodine concentrations on the respective surfaces is controlled within such range, there can be obtained a polarizing film that is suppressed in interference unevenness on the surfaces and is excellent in external appearance. Such effect becomes extremely remarkable by arranging the surface having the lower iodine concentration (that is, the surface having the iodine concentration $I_1$) on a viewer side in the application of the polarizing film to an image display apparatus. It should be noted that the term "iodine concentration" as used herein refers not to an absolute amount but to a qualitative concept, and the iodine concentration ratio $I_2/I_1$ may be determined, for example, on the basis of an intensity ratio obtained by cross-sectional Raman analysis. In addition, the iodine concentration on the viewer side surface of the polarizing film may correlate with an anisotropic reflection to be described later.

Typically, the surface having the lower iodine concentration (surface having the iodine concentration $I_1$) of the PVA-based resin film is formed on a resin substrate side in a manufacturing method to be described later in the section B, and the surface having the higher iodine concentration (surface having the iodine concentration is formed on the opposite side to the resin substrate. Further, as described above, in the application of the polarizing film to an image display apparatus, the surface having the iodine concentration $I_1$ is typically arranged on a viewer side, and the surface having the iodine concentration $I_2$ is typically arranged on the opposite side to the viewer side.

In one embodiment, the iodine concentration in the thickness direction of the PVA-based resin film substantially monotonically increases from the surface having the iodine concentration $I_1$ toward the surface having the iodine concentration $I_2$. The phrase "the iodine concentration substantially monotonically increases" as used herein refers to the fact that a distribution curve of an average iodine concentration in the thickness direction has neither a maximum nor a minimum. In this context, the average iodine concentration refers to the median of intensities measured by Raman analysis for each region obtained by dividing the PVA-based resin film in its thickness direction at intervals of 1 μm. Therefore, even in the case where "the iodine concentration substantially monotonically increases," a region where the iodine concentration has a maximum and/or a minimum may exist locally (that is, in each divided region). Such iodine concentration distribution can be achieved by the manufacturing method to be described later in the section B without any complicated operation in dyeing. Further, with such iodine concentration distribution, sufficient optical characteristics (for example, single axis transmittance and polarization degree to be described later) can be secured.

The thickness of the PVA-based resin film (polarizing film) is preferably 12 μm or less, more preferably 8 μm or less, still more preferably 6 urn or less. The PVA-based resin film having such thickness tends to have a high iodine concentration, and the external appearance-improving effect based on the provision of a difference between the iodine concentrations on the respective surfaces can be remarkably obtained. On the other hand, the thickness of the PVA-based resin film is preferably 1.0 μm or more, more preferably 2.0 μm or more.

Through the provision of a difference between the iodine concentrations on the respective surfaces of the PVA-based resin film, the reflectance of the polarizing film to be obtained in its absorption axis direction in a long wavelength region of visible light (for example, from 580 nm to 780 nm) can be reduced. This effect is particularly remarkable in the surface having the lower iodine concentration (that is, the surface having the iodine concentration $I_1$). The surface having the iodine concentration $I_1$ of the PVA-based resin film has an anisotropic reflection (Rc/Rp) at a wavelength of 680 nm of preferably 1.50 or less, more preferably 1.30 or less, still more preferably 1.20 or less. With such anisotropic reflection, interference unevenness on the surface is suppressed, and excellent external appearance can be obtained. The surface having the higher iodine concentration (that is, the surface having the iodine concentration $I_2$) has an Rc/Rp of, for example, from about 1.55 to 1.85. It should be noted that Rp represents a reflectance in the transmission axis direction of the polarizing film, and Rc represents a reflectance in the absorption axis direction of the polarizing film.

The polarizing film preferably exhibits absorption dichroism at any one of the wavelengths of from 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

B. Method of Manufacturing Polarizing Film

A method of manufacturing a polarizing film according to one embodiment of the present invention typically includes: forming a PVA-based resin layer on one side of a resin substrate; and stretching and dyeing a laminate of the resin substrate and the PVA-based resin layer to turn the polyvinyl alcohol-based resin layer into a polarizing film.

B-1. Formation of PVA-Based Resin Layer

Any appropriate method may be adopted as a method of forming the PVA-based resin layer. The PVA-based resin layer is preferably formed by applying an application liquid containing a PVA-based resin onto the resin substrate, followed by drying.

Any appropriate thermoplastic resin can be adopted as a formation material for the resin substrate. Examples of the thermoplastic resin include: an ester-based resin such as a polyethylene terephthalate-based resin; a cycloolefin-based resin such as a norbornene-based resin; an olefin-based resin such as polypropylene; a polyamide-based resin; a polycarbonate-based resin; and a copolymer resin thereof. Of those, a norbornene-based resin and an amorphous polyethylene terephthalate-based resin are preferred.

In one embodiment, amorphous (uncrystallized) polyethylene terephthalate-based resins are each preferably used. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

In one embodiment, the glass transition temperature (Tg) of the resin substrate is 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature lower than 60° C. is permitted as long as the resin substrate does not deform during the application and drying of the application liquid containing the PVA-based resin. It should be noted that the glass transition temperature of the resin substrate can be adjusted by, for example, introducing a modification group into the constituent material or heating the substrate constituted of a crystallizable material. The glass transition temperature (Tg) is a value determined in conformity with JIS K 7121.

The thickness of the resin substrate (before the stretching) is preferably 20 µm to 300 µm, more preferably 50 µm to 200 µm. When the thickness is less than 20 µm, it may be difficult to form the PVA-based resin layer. When the thickness exceeds 300 µm, an excessively large load may be needed in stretching.

The application liquid is typically a solution prepared by dissolving the PVA-based resin in a solvent. Examples of the solvent include water, dimethylsulfoxide, dimethylformamide, dimethylacetamide, N-methylpyrrolidone, polyhydric alcohols such as various glycols and trimethylolpropane, and amines such as ethylenediamine and diethylenetriamine. The solvent can be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained. In addition, examples of the additive include an easy-adhesion component. The use of the easy-adhesion component can improve adhesiveness between the resin substrate and the PVA-based resin layer. As a result, an inconvenience such as release of the PVA-based resin layer from the substrate is suppressed, and dyeing and underwater stretching to be described later can be favorably performed. A modified PVA such as acetoacetyl modified PVA is used as the easy-adhesion component.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The resin substrate may be subjected to a surface treatment (such as a corona treatment) before the formation of the PVA-based resin layer. Alternatively, an easy-adhesion layer may be formed on the resin substrate. Such treatment can improve adhesiveness between the resin substrate and the PVA-based resin layer.

The thickness of the PVA-based resin layer (before the stretching) is preferably 3 µm to 20 µm.

B-2. Stretching

Next, the laminate of the resin substrate and the PVA-based resin layer obtained in the section B-1 is stretched and dyed to turn the PVA-based resin layer into a polarizing film. The order of the stretching and the dyeing may be appropriately set depending on the purpose, a stretching mode, and the like. Specifically, the stretching may be performed first, the dyeing may be performed first, or in the case of performing the stretching in a plurality of stages, the dyeing may be performed between stretching and stretching. In this embodiment, the stretching is typically performed first.

Any appropriate method can be adopted as a method of stretching the laminate. Specifically, fixed-end stretching may be adopted or free-end stretching (such as a method involving passing the PVA-based resin layer between rolls having different peripheral speeds to uniaxially stretch the layer) may be adopted. Of those, the free-end stretching is preferred. This is because the crystallization of the PVA-based resin layer is promoted and an iodine concentration distribution can be easily produced as described below.

The stretching direction may be appropriately set. In one embodiment, the PVA-based resin layer having a long shape is stretched in its lengthwise direction. In this case, there is typically adopted a method involving passing the PVA-based resin layer (laminate) between rolls having different peripheral speeds to stretch the layer. In another embodiment, the PVA-based resin layer (laminate) having a long shape is stretched in its widthwise direction. In this case, there is typically adopted a method involving stretching the layer using a tenter stretching apparatus.

The stretching mode is preferably an in-air stretching mode. By adopting the in-air stretching mode, a desired difference can be provided between the iodine concentrations on the respective surfaces of the PVA-based resin film (polarizing film) to be obtained in the dyeing to be described later. More specifically, the iodine concentration on the surface on the resin substrate side of the PVA-based resin film can be made lower, and the iodine concentration on the surface on the opposite side to the resin substrate can be made higher. In one embodiment, the iodine concentration can be controlled to substantially monotonically increase from the surface on the resin substrate side to the surface on the opposite side to the resin substrate. Further, such iodine concentration distribution can be achieved without any complicated operation in the dyeing. Such iodine concentration control can be easily achieved by promoting the crystallization of the PVA-based resin layer before the dyeing. In particular, the combined use of the in-air stretching mode and the free-end stretching allows the control of the degree of crystallization of the PVA-based resin layer within a high range. A stretching temperature is preferably from 100° C. to 180° C., more preferably from 100° C. to 160° C. When the temperature is excessively high, the crystallization of the PVA-based resin layer proceeds excessively, and there may arise a problem such as a reduction in stretchability or a reduction in dyeing property. When the temperature is excessively low, the stretchability reduces or the crystallization of the PVA-based resin layer does not proceed sufficiently in some cases, with the result that a desired iodine concentration distribution may not be obtained. When such stretching method is adopted, the iodine concentration can be easily controlled by adjusting the iodine concentration of a dyeing bath and the period of time for immersion in the dyeing bath. Such finding has been obtained only after a large number of trials and errors on specific combinations of stretching and dyeing, and investigation of their relationships with the iodine concentration of a PVA-based resin film (polarizing film) to be obtained, and is an unexpected excellent effect.

The stretching may be performed in one stage, or may be performed in a plurality of stages. When the stretching is performed in a plurality of stages, for example, the free-end stretching and fixed-end stretching may be performed in combination. In addition, when the stretching is performed in a plurality of stages, the stretching ratio (maximum stretching ratio) of the PVA-based resin layer to be described later is the product of stretching ratios in the respective stages.

The stretching ratio (maximum stretching ratio) is preferably 4.0 times or more with respect to the original length of the PVA-based resin layer (laminate). It should be noted that the term "maximum stretching ratio" as used herein refers to a stretching ratio immediately before the rupture of the PVA-based resin layer (laminate). The stretching ratio at which the PVA-based resin layer (laminate) ruptures is separately identified and a value lower than the value by 0.2 is the maximum stretching ratio.

B-3. Dyeing

The dyeing of the PVA-based resin layer is typically performed by causing the PVA-based resin layer to adsorb iodine. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, the method involving immersing the PVA-based resin layer (laminate) in the dyeing liquid is preferred. This is because iodine can favorably adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably from 20° C. to 50° C. in order to suppress the dissolution of the PVA-based resin. In the case of immersing the PVA-based resin layer in the dyeing liquid, an immersion time is preferably from 5 seconds to 5 minutes in order to secure the transmittance of the PVA-based resin layer. In addition, dyeing conditions (concentration, liquid temperature, and immersion time) may be set so that the polarization degree, single axis transmittance, and/or iodine concentration distribution of the polarizing film to be finally obtained may fall within predetermined ranges. In one embodiment, the immersion time is set so that the polarization degree of the polarizing film to be obtained may become 99.98% or more. In another embodiment, the immersion time is set so that the single axis transmittance of the polarizing film to be obtained may become from 40% to 44%. Further, as described above, according to one embodiment, through the use of the in-air stretching mode for the stretching, the iodine concentration distribution can be controlled merely by adjusting the dyeing conditions (concentration, liquid temperature, and immersion time) without any complicated operation. That is, the iodine concentration on the surface on the resin substrate side of the PVA-based resin film can be made lower, and the iodine concentration on the surface on the opposite side to the resin substrate can be made higher.

B-4. Other Treatments

The PVA-based resin layer (laminate) may be appropriately subjected to a treatment for turning the PVA-based resin layer into a polarizing film in addition to the stretching and the dyeing. Examples of the treatment for turning the PVA-based resin layer into a polarizing film include an insolubilizing treatment, a cross-linking treatment, a washing treatment, and a drying treatment. It should be noted that the number of times, order, and the like of those treatments are not particularly limited.

The insolubilizing treatment is typically performed by immersing the PVA-based resin layer (laminate) in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C.

The cross-linking treatment is typically performed by immersing the PVA-based resin layer (laminate) in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. In a preferred embodiment, the in-air stretching, the dyeing treatment, and the cross-linking treatment are performed in the stated order.

The washing treatment is typically performed by immersing the PVA-based resin layer (laminate) in an aqueous solution of potassium iodide. A drying temperature in the drying treatment is preferably 30° C. to 100° C.

Thus, the polarizing film is formed on the resin substrate.

The polarizing film is typically used under a state in which a protective film is laminated on one side, or each of both sides, thereof (that is, as a polarizing plate). Any appropriate adhesive or pressure-sensitive adhesive is used in the lamination of the protective film. When the resin substrate is used, the resin substrate may be directly used as the protective film without being peeled off.

C. Image Display Apparatus

An image display apparatus of the present invention includes the polarizing film of present invention (in many cases, the polarizing plate). The polarizing film is typically arranged on the viewer side of the image display apparatus, and is arranged so that the surface having the lower iodine concentration (having the iodine concentration $I_1$) may be on the viewer side. As described above, the surface having the lower iodine concentration of the polarizing film of the present invention is suppressed in interference unevenness and has excellent external appearance. Arranging the polarizing film so that such surface of the polarizing film may be on the viewer side can contribute to the improvement of the display characteristics of the image display apparatus (particularly at the time of black display).

Examples of the image display apparatus include a liquid crystal display apparatus and an organic EL display apparatus. When used in the liquid crystal display apparatus, the polarizing film is preferably arranged on the viewer side of a liquid crystal cell.

Hereinafter, the present invention is specifically described byway of examples. However, the present invention is not limited by these examples. It should be noted that methods of measuring the respective characteristics are as described below.

1. Thickness

Measurement was performed with a digital micrometer (manufactured by Anritsu Corporation, product name: "KC-351C").

2. Glass Transition Temperature (Tg)

Measurement was performed in conformity with JIS K 7121.

Example 1

Used as a resin substrate was a long amorphous polyethylene terephthalate (A-PET) film (thickness: 100 μm) containing isophthalic acid as a copolymerization component and having a Tg of 75° C.

An aqueous solution of PVA having a polymerization degree of 4,200 and a saponification degree of 99.2 mol % was applied onto one surface of the resin substrate and dried at 60° C. to form a PVA-based resin layer having a thickness of 13 μm. Thus, a laminate was produced.

The resultant laminate was subjected to free-end uniaxial stretching in its longitudinal direction (lengthwise direction) at 4.2 times in an oven at 130° C. between rolls having different peripheral speeds.

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 60° C. (an aqueous solution of boric acid obtained by compounding 100 parts by weight of water with 5 parts by weight of potassium iodide and 5 parts by weight of boric acid) for 30 seconds (cross-linking treatment).

After that, the laminate was immersed in a washing bath having a liquid temperature of 30° C. (an aqueous solution obtained by compounding 100 parts by weight of water with 4 parts by weight of potassium iodide), and then dried with warm air at 60° C. (washing-drying treatment).

Thus, a polarizing film (PVA-based resin film) having a thickness of 6.0 μm was formed on the resin substrate.

A triacetylcellulose film (manufactured by KONICA MINOLTA, INC., trade name: "KC4UY", thickness: 40 μm) was attached as a first protective film to the polarizing film surface of the obtained laminate of the resin substrate and the polarizing film through the intermediation of an adhesive. Further, the resin substrate was peeled off, and a triacetylcellulose film (manufactured by KONICA MINOLTA, INC., trade name: "KC4UY", thickness: 40 μm) was attached as a second protective film to the peeling surface through the intermediation of the adhesive. The adhesive used in this case was PVA having an acetoacetyl modification group (manufactured by KURARAY CO., LTD., trade name: "Z200"). Thus, a polarizing plate was obtained. A pressure-sensitive adhesive was applied onto the first protective film side surface of the obtained polarizing plate. That is, there was adopted a configuration in which the second protective film side surface (resin substrate side surface) of the polarizing plate was on a viewer side.

Example 2

A polarizing plate was obtained in the same manner as in Example 1 except that the stretching ratio was changed to 4.0 times and a polarizing film having a thickness of 7.0 μm was formed. Further, in the same manner as in Example 1, there was adopted a configuration in which the second protective film side surface (resin substrate side surface) of the polarizing plate was on a viewer side.

Example 3

A polarizing plate was obtained in the same manner as in Example 1 except that the thickness of the PVA aqueous solution applied was changed to form a PVA-based resin layer having a thickness of 20 μm, and consequently, a polarizing film having a thickness of 11.0 μm was formed. Further, in the same manner as in Example 1, there was adopted a configuration in which the second protective film side surface (resin substrate side surface) of the polarizing plate was on a viewer side.

Comparative Example 1

A polarizing plate was obtained in the same manner as in Example 1. A pressure-sensitive adhesive was applied onto the second protective film side surface of the obtained polarizing plate. That is, there was adopted a configuration in which the first protective film side surface (surface on the opposite side to the resin substrate) of the polarizing plate was on a viewer side.

Comparative Example 2

A polarizing plate was obtained in the same manner as in Example 2. A pressure-sensitive adhesive was applied onto the second protective film side surface of the obtained polarizing plate. That is, there was adopted a configuration in which the first protective film side surface (surface on the opposite side to the resin substrate) of the polarizing plate was on a viewer side.

Comparatve Example 3

A polarizing plate was obtained in the same manner as in Example 3. A pressure-sensitive adhesive was applied onto the second protective film side surface of the obtained polarizing plate. That is, there was adopted a configuration in which the first protective film side surface (surface on the opposite side to the resin substrate) of the polarizing plate was on a viewer side.

Comparative Example 4

Used as a resin substrate was a long amorphous polyethylene terephthalate (A-PET) film (thickness: 100 μm) containing isophthalic acid as a copolymerization component and having a Tg of 75° C.

An aqueous solution of PVA having a polymerization degree of 4,200 and a saponification degree of 99.2 mol % was applied onto one surface of the resin substrate and dried at 60° C. to form a PVA-based resin layer having a thickness of 10 μm. Thus, a laminate was produced.

The resultant laminate was subjected to free-end uniaxial stretching in its longitudinal direction (lengthwise direction) at 2.0 times in an oven at 120° C. between rolls having different peripheral speeds (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was uniaxially stretched in its longitudinal direction (lengthwise direction) between rolls having different peripheral speeds while being immersed in an aqueous solution of boric acid having a liquid temperature of 70° C. (an aqueous solution obtained by compounding 100 parts by weight of water with 4 parts by weight of boric acid and 5 parts by weight of potassium iodide) (in-solution stretching). In this case, the total stretching ratio was 5.5 times of the original length.

Further, the laminate was immersed in a washing bath having a liquid temperature of 30° C. (an aqueous solution obtained by compounding 100 parts by weight of water with 4 parts by weight of potassium iodide), and then dried with warm air at 60° C. (washing-drying treatment).

Thus, a polarizing film (PVA-based resin film) having a thickness of 5.0 μm was formed on the resin substrate.

Subsequently, a polarizing plate was obtained by the same procedure as that of Example 1. Further, in the same manner as in Example 1, there was adopted a configuration in which the second protective film side surface (resin substrate side surface) of the polarizing plate was on a viewer side.

Figure 1:
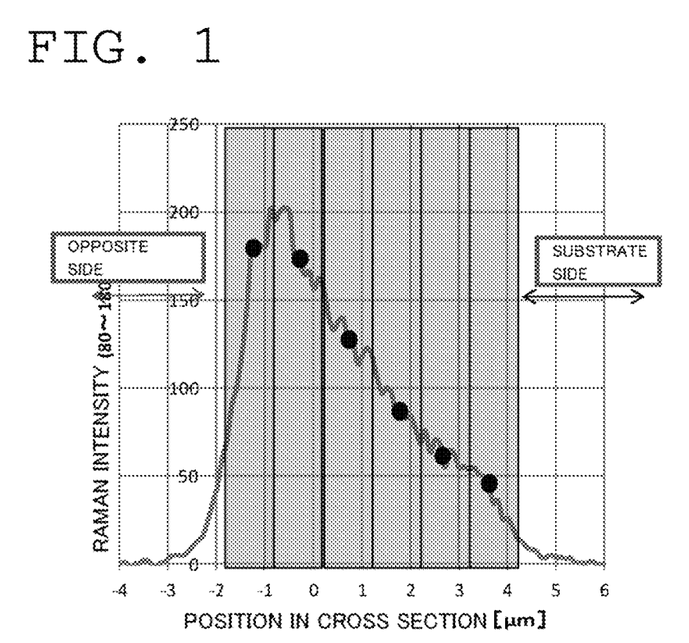
FIG. 1 is a graph showing an iodine concentration distribution in the thickness direction of each of polarizing films obtained in Example 1 and Comparative Example 1.
Figure 2:
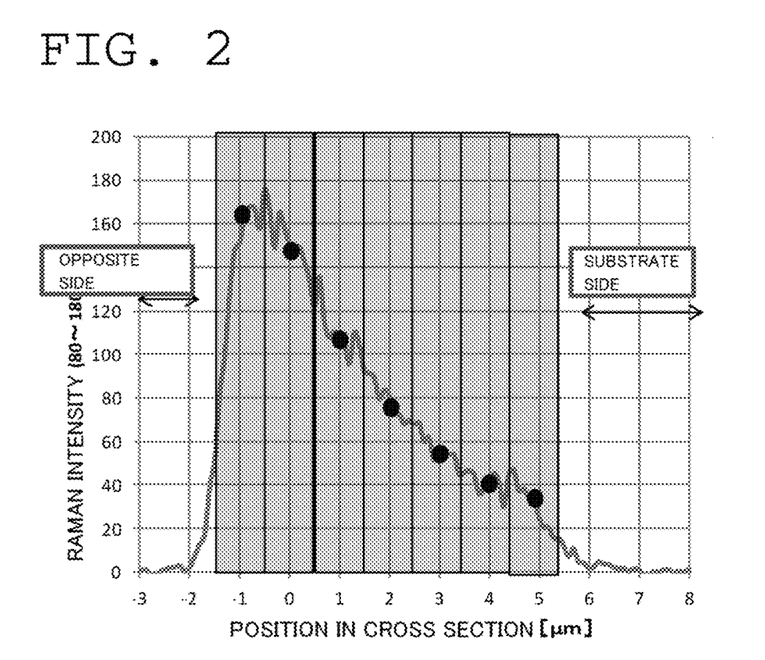
FIG. 2 is a graph showing an iodine concentration distribution in the thickness direction of each of polarizing films obtained in Example 2 and Comparative Example 2.
Figure 3:
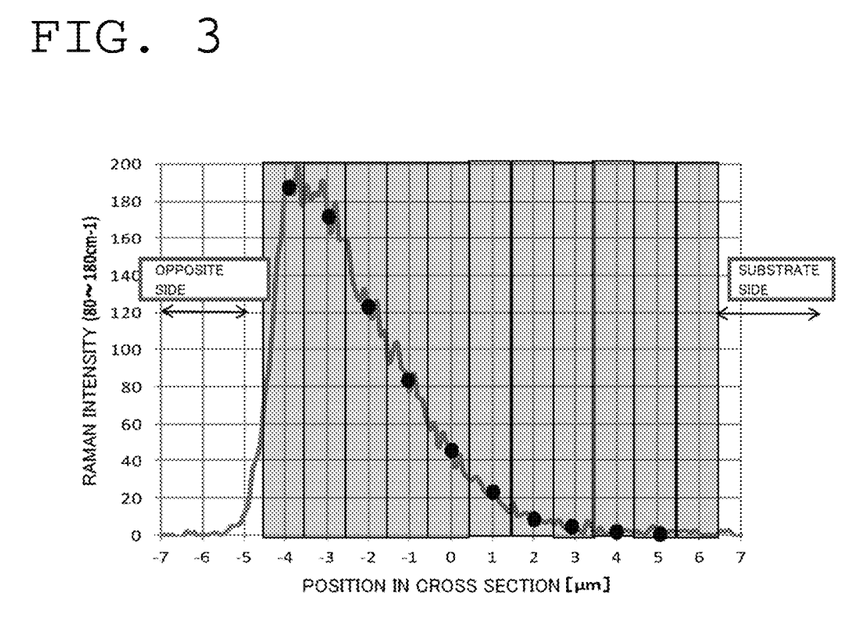
FIG. 3 is a graph showing an iodine concentration distribution in the thickness direction of each of polarizing films obtained in Example 3 and Comparative Example 3.
Figure 4:
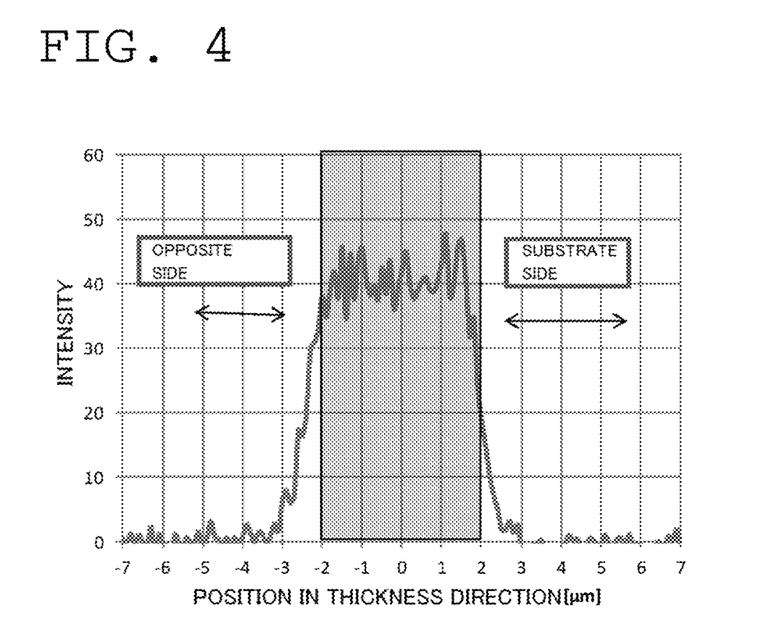
FIG. 4 is a graph showing an iodine concentration distribution in the thickness direction of a polarizing film obtained in Comparative Example 4.

The reflectances of the viewer side surface of each of the polarizing films obtained in Examples 1 to 3 and Comparative Examples 1 to 4 were measured as described below, and its anisotropic reflection was calculated. Further, the iodine concentration distribution in the thickness direction of each obtained polarizing film was measured. Table 1 shows evaluation results. Regarding the iodine concentration distribution, FIG. 1 shows the measurement results of the polarizing films of Example 1 and Comparative Example 1, FIG. 2 shows the measurement results of the polarizing films of Example 2 and Comparative Example 2, FIG. 3 shows the measurement results of the polarizing films of Example 3 and Comparative Example 3, and FIG. 4 shows the measurement results of the polarizing film of Comparative Example 4. It should be noted that "SUBSTRATE SURFACE" in each of FIGS. 1 to 3 is on the viewer side of the polarizing film of each of Examples and is on the opposite side to the viewer side of the polarizing film of each of Comparative Examples, and "SUBSTRATE SURFACE" in FIG. 4 is on the viewer side of the polarizing film of Comparative Example 4.

(Reflectance)

A reflectance in a transmission axis direction (Rp) and a reflectance in an absorption axis direction (Rc) were measured with a spectrophotometer (manufactured by Hitachi High-Technologies Corporation, U-4100). In the measurement, the incidence angle of a light source was set to 5°, and a measurement wavelength was set to 680 nm. It should be noted that the anisotropic reflection was calculated by Rc/Rp.

(Iodine Concentration Distribution)

(i) Raman Spectroscopy Measurement

Figure 5A:
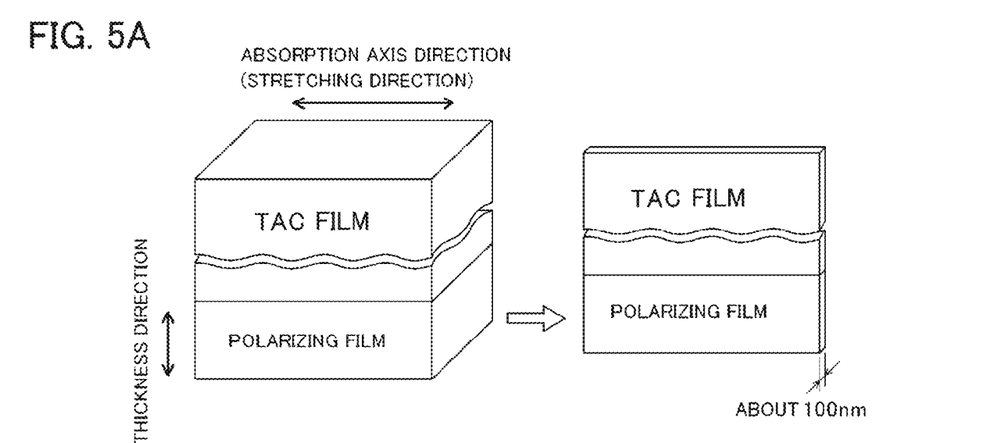
FIGS. 5A and 5B are schematic views illustrating a procedure for Raman spectroscopy measurement for measuring an iodine concentration distribution.

As illustrated in FIG. 5A, the central portion of each of the laminates obtained in Examples and Comparative Examples was cut in the absorption axis direction (stretching direction) of the polarizing film and in the thickness direction of the polarizing film using an ultramicrotome (manufactured by LEICA MICROSYSTEMS, trade name: "LEICA ULTRACUT UCT" or "LEICA EM UC7") to produce an ultrathin section sample measuring about 100 nm in a direction perpendicular to the absorption axis direction of the polarizing film and to the thickness direction of the polarizing film.

An apparatus and conditions for Raman spectroscopy are as described below.

Apparatus: micro-laser Raman spectrometer: LabRAM HR-800, manufactured by JOBIN YVON S.A.S. (manufactured by HORIBA JOBIN YVON S.A.S., HR800)

Excitation wavelength: 514.5 nm

Grating: 1,800 gr/mm

Object lens: ×100 (numerical aperture: 0.9)

Measurement pitch: 0.1 μm

Figure 5B:
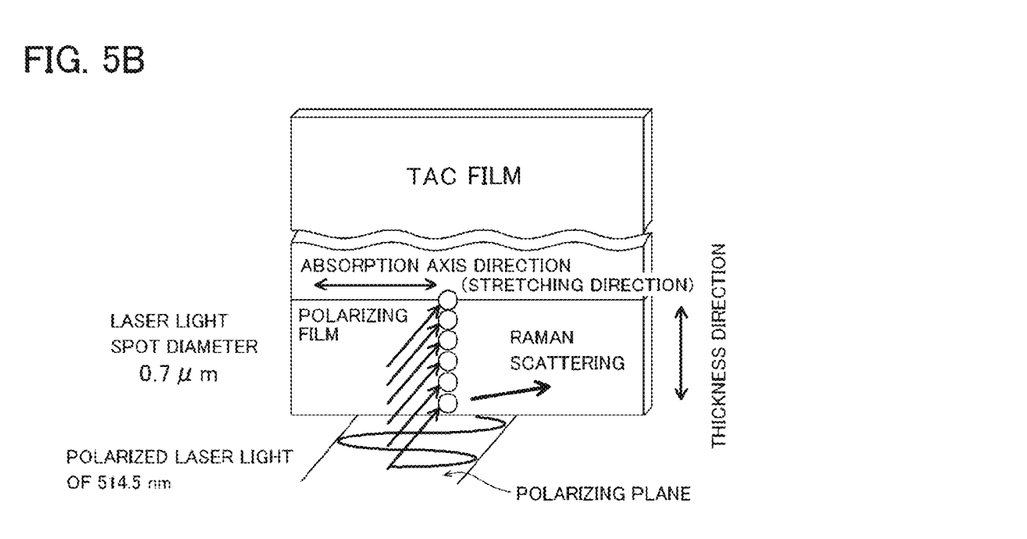

As illustrated in FIG. 5B, the polarizing film cross-section of the ultrathin section sample was subjected to the measurement of Raman spectra at measurement points at intervals of 0.1 μm in the thickness direction of the polarizing film. Laser light was caused to enter so that its polarization plane was parallel to the absorption axis direction (stretching direction) of the polarizing film and perpendicular to the polarizing film cross-section of the ultrathin section sample. In addition, an analyzer was placed behind the ultrathin section sample. The polarization plane of the analyzer was set to be parallel to the polarization plane of the laser light.

In each of the Raman spectra of Examples and Comparative Examples, a peak corresponding to $I_3^-$ was observed at around 108 cm$^{-1}$, and a peak corresponding to $I_5^-$ was observed at around 158 cm$^{-1}$.

(ii) Calculation of Integrated Intensity Distribution of $I_3^-$ and $I_5^-$

Main absorption in the visible light region (from 380 nm to 780 nm) is exhibited by iodine/PVA complexes formed by $I_3^-$ and $I_5^-$ with PVA. Accordingly, the measurement of the Raman intensities of $I_3^-$ and $I_5^-$ enables comparison in effective iodine amount that affects viewing. A specific calculation procedure is as described below.

For the Raman spectrum obtained at each measurement point, an integrated intensity in a wavenumber interval ranging from 80 cm$^{-1}$ to 180 cm$^{-1}$ was determined by performing baseline correction.

Figure 6:
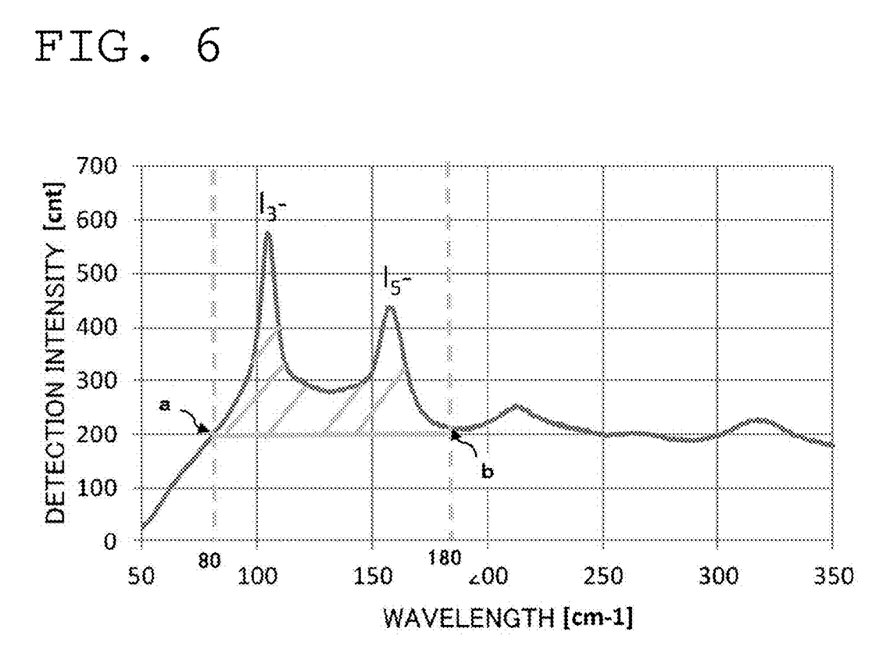
FIG. 6 is a spectrum illustrating a procedure for determining an integrated intensity distribution in the Raman spectroscopy measurement.

The baseline correction was performed as follows: as illustrated in FIG. 6, in the wavenumber interval ranging from 80 cm$^{-1}$ to 180 cm$^{-1}$, a straight line connecting the respective points of a Raman intensity at a wavenumber of 80 cm$^{-1}$ and a Raman intensity at a wavenumber of 180 cm$^{-1}$ was used to approximate the baseline of the Raman spectrum as a straight line (straight line ab in FIG. 6), and the slope of the baseline at the time of the measurement was corrected with a distance from the approximation straight line being defined as a Raman intensity. An integrated intensity distribution in the thickness direction of the polarizing film was determined from the obtained integrated intensities at the respective measurement points. The integrated intensity distribution in the thickness direction was defined as an iodine concentration distribution.

TABLE 1

| | Stretching | Viewer side | Thickness (μm) | Rc/Rp | Iodine concentration distribution | $I_2/I_1$ |
|---|---|---|---|---|---|---|
| Example 1 | In-air | Stretching substrate side | 6.0 | 1.10 | Monotonically increasing from viewer side | 3.6 |
| Example 2 | In-air | Stretching substrate side | 7.0 | 1.20 | Monotonically increasing from viewer side | 4.6 |
| Example 3 | In-air | Stretching substrate side | 11.0 | 1.10 | Monotonically increasing from viewer side | 188 |
| Comparative Example 1 | In-air | Opposite side | 6.0 | 1.60 | Monotonically reducing from viewer side | 3.6 |
| Comparative Example 2 | In-air | Opposite side | 7.0 | 1.80 | Monotonically reducing from viewer side | 4.6 |
| Comparative Example 3 | In-air | Opposite side | 11.0 | 1.60 | Monotonically reducing from viewer side | 188 |
| Comparative Example 4 | In-air + in-solution | Stretching substrate side | 5.0 | 1.10 | Almost constant | 1.1 |

As is apparent from Table 1, a polarizing film having a small anisotropic reflection and excellent in external appearance is obtained by providing a difference between the iodine concentrations on the respective surfaces of the polarizing film, and arranging the surface having the lower iodine concentration on the viewer side. Further, visual observation of the polarizing films of Examples confirmed that no interference unevenness was found. As is apparent from Comparative Example 4, the effect of the present invention as described above is obtained by adopting the in-air stretching mode.

The polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens. The polarizing film of the present invention is also suitably used as an antireflection film for an organic EL panel.

According to one embodiment of the present invention, the polarizing film that is suppressed in anisotropic reflection and interference unevenness, and is excellent in external appearance can be obtained by providing a predetermined difference between the iodine concentrations on the respective surfaces of the polarizing film, and adopting a configuration in which the surface having the lower iodine concentration is on a viewer side. In addition, the use of such polarizing film can contribute to the improvement of the display characteristics of an image display apparatus.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polarizing film, comprising a polyvinyl alcohol-based resin film containing iodine,
   wherein the polarizing film has a ratio $I_2/I_1$ between an iodine concentration $I_1$ on one surface and an iodine concentration $I_2$ on another surface of 3.0 or more, and
   wherein the surface having the iodine concentration $I_1$ has an anisotropic reflection (Rc/Rp) at a wavelength of 680 nm of 1.50 or less.

2. A polarizing film according to claim 1, wherein the polarizing film is used so that the surface having the iodine concentration $I_1$ is on a viewer side.

3. A manufacturing method for the polarizing film according to claim 1, the manufacturing method comprising:
   forming a polyvinyl alcohol-based resin layer on one side of a resin substrate; and
   stretching and dyeing a laminate of the resin substrate and the polyvinyl alcohol-based resin layer to turn the polyvinyl alcohol-based resin layer into a polarizing film,
   the polarizing film having a ratio $I_2/I_1$ between an iodine concentration $I_1$ on a surface on a resin substrate side and an iodine concentration $I_2$ on a surface on an opposite side to the resin substrate of 3.0 or more.

4. A manufacturing method according to claim 3, wherein the stretching is performed using in-air stretching alone.

5. A manufacturing method according to claim 4, wherein a stretching temperature in the in-air stretching is 120° C. or more.

6. An image display apparatus, comprising the polarizing film according to claim 1,
   wherein the polarizing film is arranged so that the surface having the iodine concentration is on a viewer side.

7. An image display apparatus according to claim 6, wherein the $I_2/I_1$ ratio is 2.5 or more.

8. An image display apparatus according to claim 6, wherein the $I_2/I_1$ ratio is 4.0 or more.

9. An image display apparatus according to claim 6, wherein the anisotropic reflection (Rc/Rp) is 1.30 or less.

10. An image display apparatus according to claim 6, wherein the anisotropic reflection (Rc/Rp) is 1.20 or less.

11. A polarizing film according to claim 1, wherein the $I_2/I_1$ ratio is 3.5 or more.

12. A polarizing film according to claim 1, wherein the $I_2/I_1$ ratio is 4.0 or more.

13. A polarizing film according to claim 1, wherein the anisotropic reflection (Rc/Rp) is 1.30 or less.

14. A polarizing film according to claim 1, wherein the anisotropic reflection (Rc/Rp) is 1.20 or less.

* * * * *

UNITED STATES PATENT AND TRADEMARK OFFICE
CERTIFICATE OF CORRECTION

PATENT NO.       : 9,690,011 B2
APPLICATION NO.  : 14/464199
DATED            : June 27, 2017
INVENTOR(S)      : Shusaku Goto et al.

Page 1 of 1

It is certified that error appears in the above-identified patent and that said Letters Patent is hereby corrected as shown below:

In the Claims

Column 14 Line 43:
Change:
having the iodine concentration is on a viewer side.
To be:
having the iodine concentration $I_1$ is on a viewer side.

Column 14 Line 45:
Change:
An image display apparatus according to claim 7, wherein the $I_2/I_1$ ratio is 2.5 or more.
To be:
An image display apparatus according to claim 7, wherein the $I_2/I_1$ ratio is 3.5 or more.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*